July 3, 1956 G. E. LUND 2753,545

TWO ELEMENT PER BIT SHIFT REGISTERS
REQUIRING A SINGLE ADVANCE PULSE
Filed Oct. 8, 1954

INVENTOR.
GEORGE E. LUND
BY Laurence R. Brown
ATTORNEY

United States Patent Office 2,753,545
Patented July 3, 1956

2,753,545

TWO ELEMENT PER BIT SHIFT REGISTERS REQUIRING A SINGLE ADVANCE PULSE

George E. Lund, Havertown, Pa., assignor to Burroughs Corporation, Detroit, Mich., a corporation of Michigan Application October 8, 1954, Serial No. 461,242

3 Claims. (Cl. 340—174)

Figure 1:
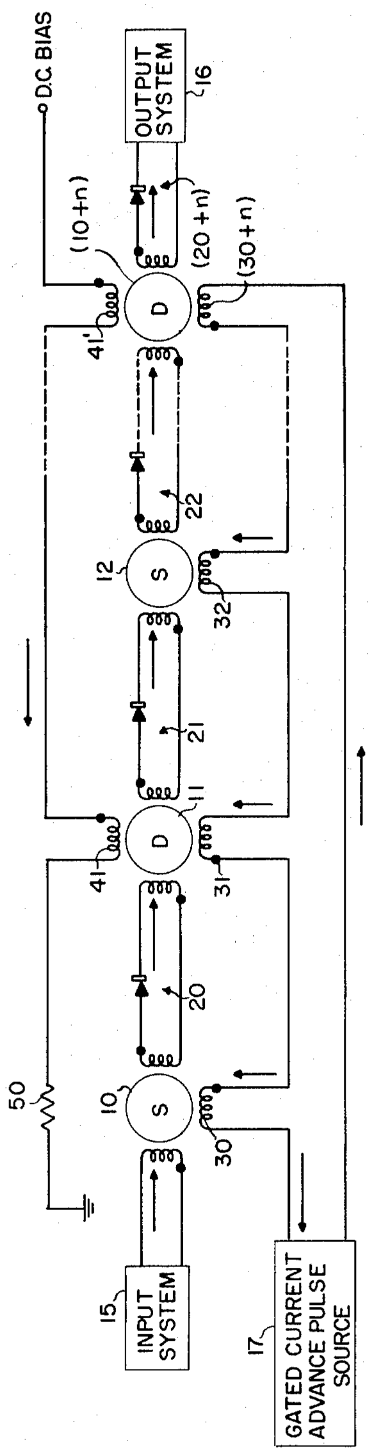

This invention relates to memory circuits and methods and, more particularly it relates to static magnetic storage elements for passing information from one storage location to another storage location only during the time the magnetic elements are switched from one remanence condition to another.

Early prior art magnetic storage elements have been extensively used as switching devices in shift register circuits. The magnetic switching elements of these registers have taken advantage of the substantially rectangular hysteresis characteristics exhibited by magnetic core materials. These elements tend to remain in one or the other permanent magnetic remanence condition after being driven into magnetic saturation of the corresopnding polarity. In general, the elements are saturated by signals presented at transfer windings about the cores, which are conventionally, although not necessarily of toroidal configuration. The two states of magnetic remanence provided by these cores enable them to store binary information efficiently and retain it statically until removed.

Because of the rectangular hysteresis characteristic of the core, little voltage will be induced in the windings by input signals of a polarity tending to establish a saturation polarity corresponding to the remanence condition within the core. However, when the storage state is disturbed by an input signal opposite in polarity to the remanent storage state of the element, a high voltage is induced in the transformer windings. Accordingly, the elements may be interrogated with a signal of known polarity to thereby determine the remanence condition by the presence or absence of an output signal in the transformer windings about the element. Such elements are normally cascaded so that the output signal from one magnetic storage element becomes the input to a succeeding magnetic storage element. This is attained by connecting the output winding of the first storage element to the input winding of the second storage element through a suitable coupling network providing for transmission of information in a single direction. If each magnetic storage element is used as a binary storage element, then read-in and read-out tends to occur simultaneously. Such operation is to be avoided and normally an additional magnetic storage element or other delay means is required so that read-in occurs in a given element after read-out into a succeeding storage element. This operation then requires an additional interrogation source for the delay storage element and conventionally a shift register has been operated from two alternately provided sets of advancing pulses.

A general object of this invention is to provide improved shift register circuits.

A more specific object of the invention is to provide a magnetic shift register having two elements for each bit of stored information but only requiring a single advance pulse source.

Realization of the improvement afforded by this invention is accomplished by providing a direct current bias to each of the delay magnetic elements of a shift register in such polarity that the application of advance current pulses cancels the bias. In this manner data is read into the delay cores from the storage elements in response to advance pulses. At the termination of the advance pulse, the bias is again effective in the delay elements to automatically cause the transfer of information from the delay element into the following storage element without a further alternately applied advance pulse.

Figure 2:
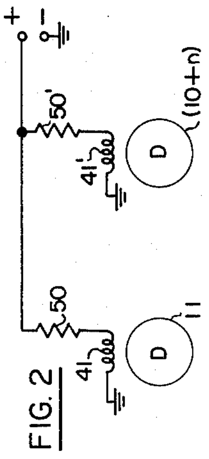

Further aspects of the invention are described hereinafter in more detail with reference to the accompanying drawing, in which:

Fig. 1 is a schematic diagram of a magnetic shift register circuit embodying the invention; and Fig. 2 is a further schematic circuit embodiment of the invention.

In the circuit of the drawing alternate cores are labelled S and D to indicate respectively their storage and delay function. Each of the cores 10, 11, 12 through (10+$n$), where $n$ is determined by the number of intermediate cores, are coupled in cascade circuit between an input system 15 and an output system 16. In general, the same principles apply to a storage system of any number of cascade coupled elements greater than two. It may be assumed that the input system provides binary information for storage in the register, and that the information is supplied in timed relationship with the advance pulses of the gated current source 17. Such timing techniques are well known in both the magnetic shift register and computer arts and therefore need not be described in detail.

Similar information transfer circuits 20, 21, 22 through (20+$n$) are supplied to couple each of the storage elements in the register. A single series diode may be coupled in these circuits to assure that information of a single polarity is passed from one element to the next. Other types of known coupling circuits may alternatively be used if desired.

Each of the elements is supplied with an advance or interrogation winding 30, 31 through (30+$n$). Current pulses from the source 17 are passed serially through each of these advance windings for establishing saturation flux in the associated elements. More strictly speaking, the windings 31 and (30+$n$) are neutralizing windings for the advance windings 41 and 41′, as will be more fully discussed hereinafter. The series circuit is preferred since as each element is driven into its saturation condition, it presents low impedance and therefore does not retard switching of other elements into saturation. Thus, the switching times of individual cores need not be matched as carefully as if the advance windings were connected in parallel circuit.

The dot notation is used to indicate the relative orientation of the different windings about the magnetic cores. The associated arrows indicate the direction of current flow. Thus, the reference storage condition "0" is established by current flow into a dotted winding terminal, whereas the information storage condition "1" is established by current flow into an undotted winding terminal.

Thus, it is noted that the presence of a signal current from the input system 15 will cause a "1" to be stored in core 10, and this may be transferred from core to core by current flowing in the respective coupling circuits. In each of the storage cores S, the advance current flows into a dotted winding terminal to establish the reference "0" state. Thus, a read-out current passes through the information transfer loop if a "1" has been stored in these storage cores and switching takes place in response to the advance current.

In the delay cores D however, the advance current through windings 31 and (30+$n$) tends to establish the "1" storage state. The advance windings 41, 41′, etc. are provided for each of these delay elements. Direct current bias is provided for these advance windings 41, 41' such that current enters the dotted terminals of the series connected windings 41 and therefore tends to continually drive the delay elements into their "0" saturation condition. The neutralizing windings 31, (30+$n$) to the delay elements have enough turns to cause the advance current to override the biased saturation and establish a "1" saturation condition in the presence of a coincident input signal. To reduce the power requirements of both the input signal and the advance current source, the high series resistance 50 is connected in the bias circuit. This series resistor, which may be a choke or a pentode, is used to create a constant current in windings 41 and 41'. Alternately parallel drive may be accomplished as shown in Fig. 2 wherein each winding has a series impedance element 50. Therefore the coincident advance current pulses and information transfer may readily overcome the substantially constant voltage bias condition.

Consider the delay element 11 during the two operating conditions of "0" and "1" transfer from element 10. As the advance pulse is present, current flows in the coupling loop 20 only for the "1" transfer. Thus, if both the advance and information current coincide, they oppose the bias current and override it in the presence of a "1" transfer. However, if a "0" is stored in element 10, no information current flows in coupling circuit 20 and the advance current through winding 31 alone will not be able to override the bias current through winding 41. Accordingly, upon expiration of the advance pulse, no change occurs in the delay element 11 for a "0" transfer. With a "1" transfer, however, a current is induced in transfer loop 21 as the advance pulse expires and causes the bias to return the delay element to its "0" reference condition. Thus, the transfer action from element to element is effected.

Since the transfer of a bit from the delay element cannot occur until the expiration of the transfer current from the preceding storage element, there can be no loss of information in the register during readout. Also, because of the rapid restoration of the bias condition at the expiration of transfer, high speed operation of the register is facilitated.

Having therefore described in detail the organization and operation of the invention, it is clear that the state of the art is advanced and that improved shift register circuits and methods are afforded by the invention. Those features of novelty believed descriptive are defined with particularity in the appended claims.

What is claimed is:

1. A magnetic shift register comprising a series of alternately disposed storage and delay elements each responsive to applied magnetic flux, a unidirectional information transfer circuit coupling adjacent elements, means for providing a magnetic bias flux for each delay element, means for providing an advance flux to all of said elements simultaneously in opposite polarities to the respective delay and storage elements and in such polarity that the bias flux in each delay element tends to be diminished by both the advance flux and information coupled to the transfer circuits, and circuit parameters such that coincident advance flux and information transfer overrides the bias flux.

2. A two element per bit storage circuit requiring a single advance pulse comprising in combination, a magnetic storage element, a magnetic delay element coupling the storage element to a further circuit, means for biasing the delay element with a steady magnetic flux, means applying an advance magnetic flux to both elements in unison, and means for overcoming the bias in response to read-out from the storage element in substantial coincidence with the advance flux.

3. The method of transferring information along a magnetic shift register circuit having two elements per bit of storage space comprising the steps of biasing alternate magnetic elements to a reference condition, and simultaneously applying advance pulses to all elements with alternate elements receiving the pulses in opposite sense and the said biased elements receiving the advance pulses in a sense tending to overcome the bias.

References Cited in the file of this patent

UNITED STATES PATENTS

| | | |
|---|---|---|
| 2,519,513 | Thompson | Aug. 22, 1950 |
| 2,591,406 | Carter | Apr. 1, 1952 |
| 2,652,501 | Wilson | Sept. 15, 1953 |
| 2,654,080 | Browne | Sept. 29, 1953 |
| 2,691,155 | Rosenberg | Oct. 5, 1954 |